United States Patent [19]

Maruska

[11] Patent Number: 4,823,816
[45] Date of Patent: Apr. 25, 1989

[54] BLADE APPARATUS FOR RENEWING CUTTING EDGES IN CORN PROCESSING EQUIPMENT

[76] Inventor: Gerald F. Maruska, 329 Cheyenne Trail, Madison, Wis. 53705

[21] Appl. No.: 937,320

[22] Filed: Dec. 3, 1986

Related U.S. Application Data

[62] Division of Ser. No. 733,989, May 13, 1985.

[51] Int. Cl.⁴ .............................................. A01F 11/06
[52] U.S. Cl. .................................. 130/9 B; 144/241
[58] Field of Search ................... 76/101 A, DIG. 8; 407/28; 130/9 B; 30/49, 52; 144/241

[56] References Cited

U.S. PATENT DOCUMENTS

| | | | |
|---|---|---|---|
| 654,540 | 6/1900 | Hoke . | |
| 711,716 | 10/1902 | Collet | 144/241 |
| 1,282,790 | 10/1918 | Fenn . | |
| 1,929,586 | 10/1933 | Holland-Letz | 146/121 |
| 2,108,797 | 2/1938 | Comstock | 76/DIG. 8 |
| 2,228,572 | 1/1941 | Lofgren | 30/279 |
| 2,545,533 | 3/1951 | Stewart | 30/49 |
| 2,577,530 | 12/1951 | Kerr | 130/9 B |
| 2,593,307 | 4/1952 | Jacobsen | 30/52 |
| 2,710,446 | 6/1955 | Seko | 30/49 |
| 2,787,273 | 4/1957 | Kerr | 130/9 |
| 3,127,676 | 4/1964 | Johnson | 30/49 |
| 3,203,427 | 8/1965 | Urschel | 130/9 |
| 3,592,249 | 7/1971 | Ross | 146/242 |
| 3,625,223 | 12/1971 | Shuler | 130/98 |
| 3,709,272 | 1/1973 | Bowers | 144/241 |
| 3,892,265 | 7/1975 | Vanek | 144/241 |
| 4,280,541 | 7/1981 | Reimler et al. | 144/241 |
| 4,330,576 | 5/1982 | Dodd | 76/DIG. 8 |
| 4,338,771 | 7/1982 | Hummel et al. | 56/294 |
| 4,576,527 | 3/1986 | Haug | 407/28 |

OTHER PUBLICATIONS

FMC Service Manual SC-120, p. 1–10, FMC Corporation, 1980.
FMC Drawing No. 60-27, 3-A Cutter, 5/10/60.

Primary Examiner—Paul J. Hirsch
Attorney, Agent, or Firm—Quarles & Brady

[57] ABSTRACT

A method of renewing a cutting edge on a knife used in a corn cutting machine includes providing a planar knife blade with an oblique cutting edge, positioning the blade longitudinally with respect to, and at an angle to, an oncoming ear of corn and then, flexing the blade transversely to cause it to conform to a desired cutting profile, while also stiffening the blade in the direction of the oncoming ear of corn. A preferred knife blade holder and replaceable blade are also disclosed.

17 Claims, 3 Drawing Sheets

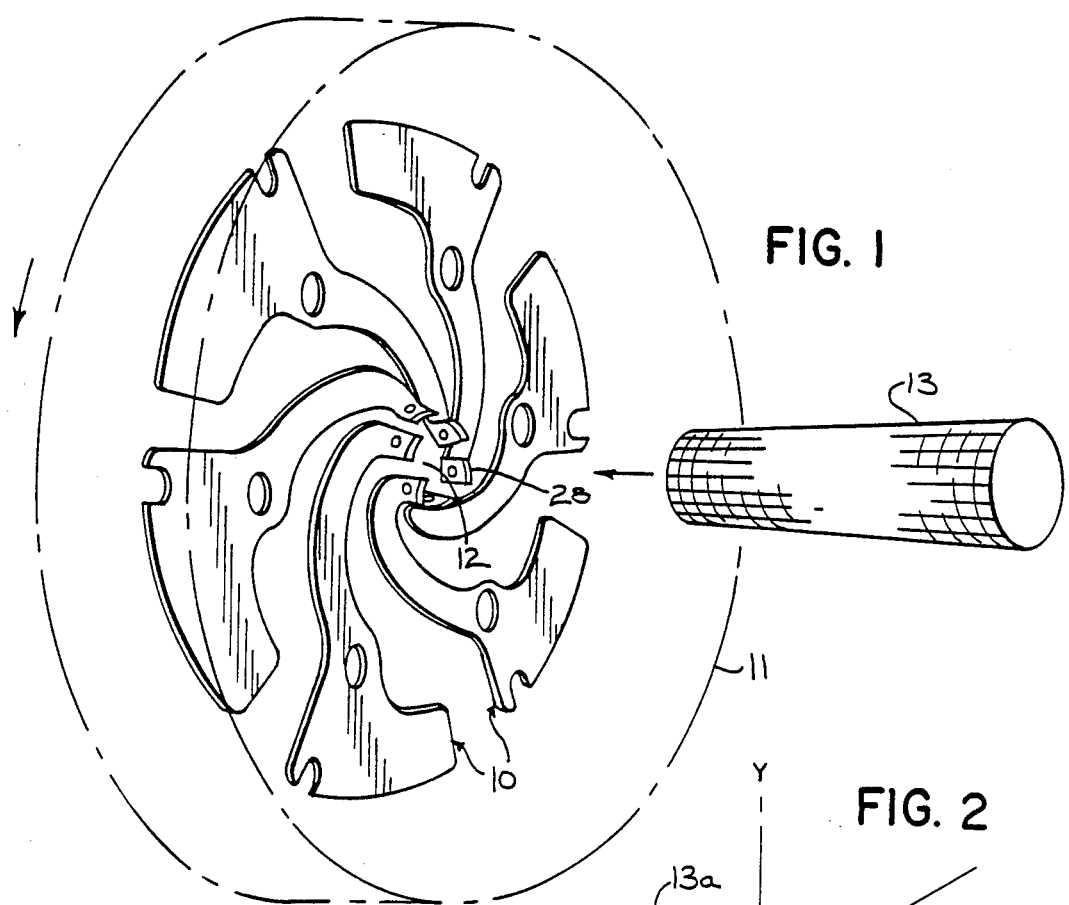
FIG. 1
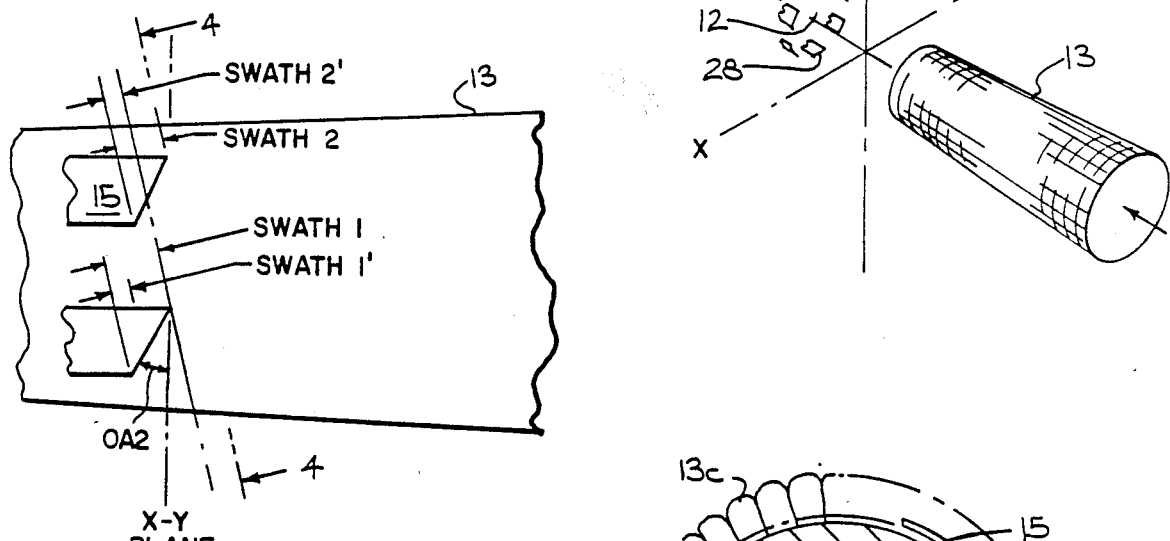
FIG. 2
FIG. 3
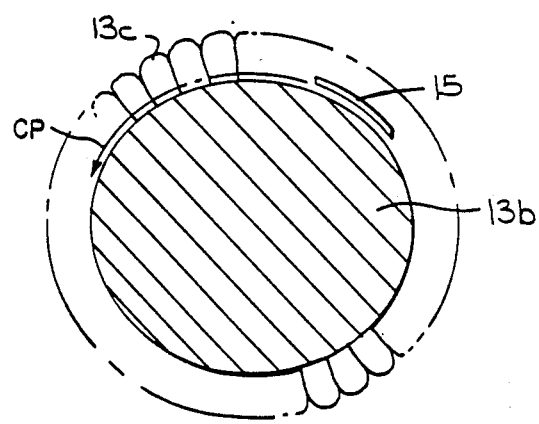
FIG. 4

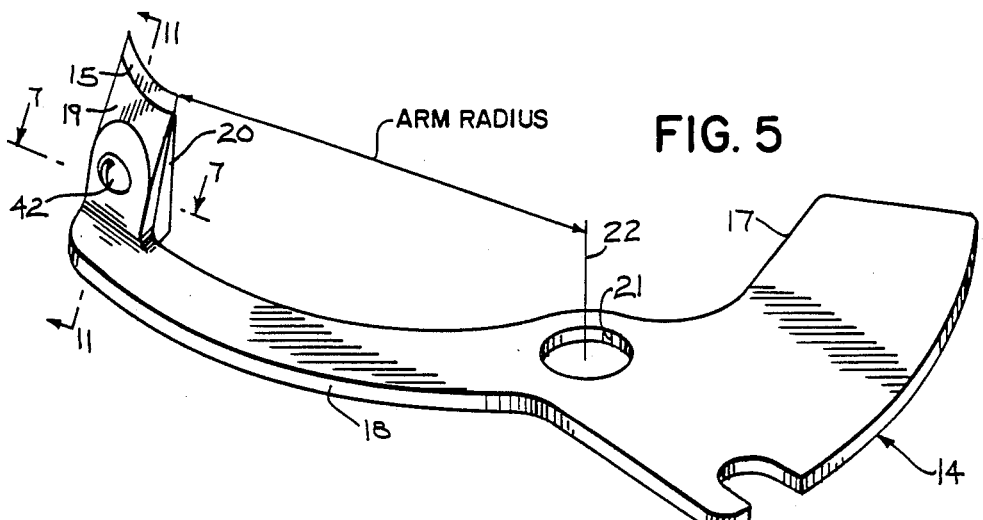
FIG. 5
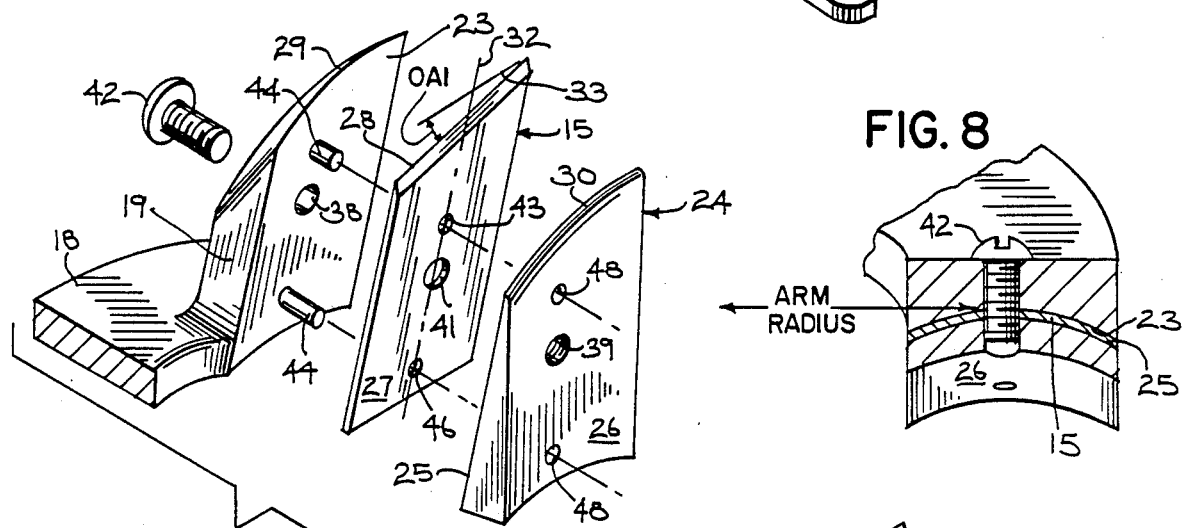
FIG. 8
FIG. 6
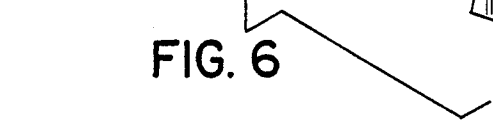
FIG. 7
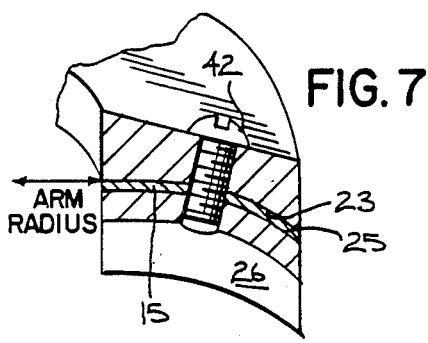
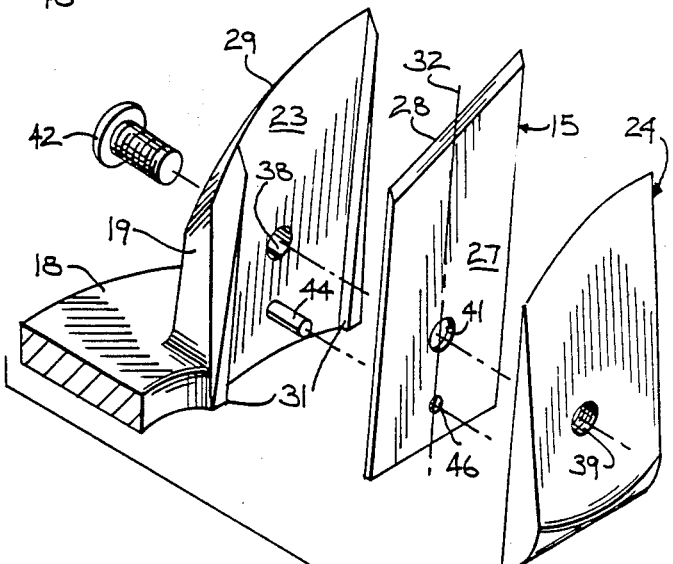
FIG. 9
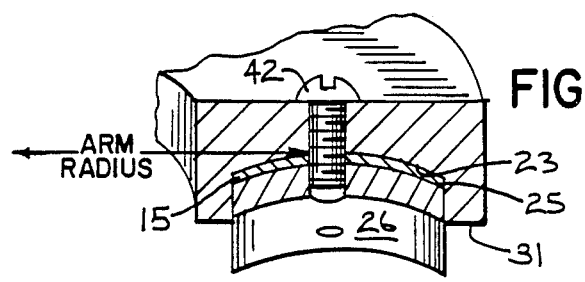
FIG. 10

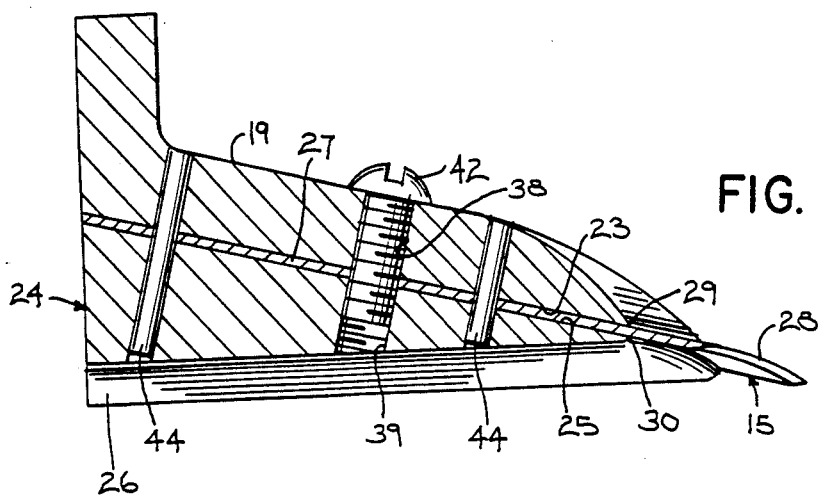
FIG. 11
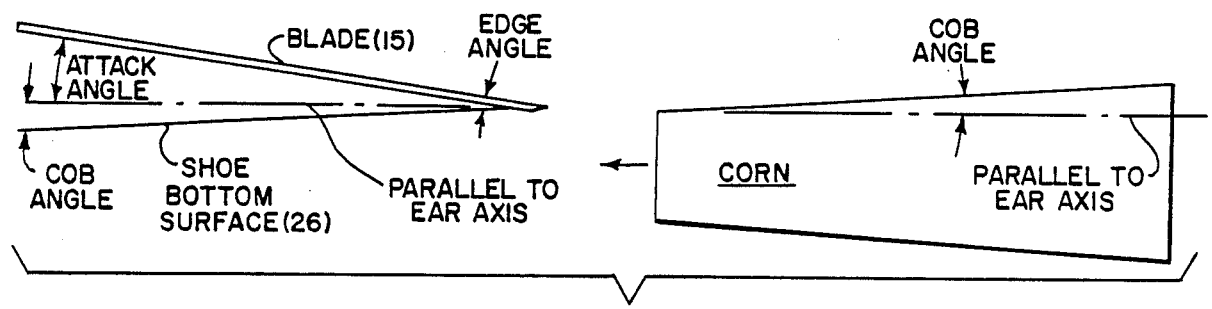
FIG. 12
FIG. 15  FIG. 13  FIG. 16
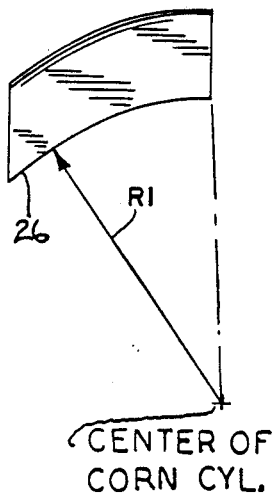
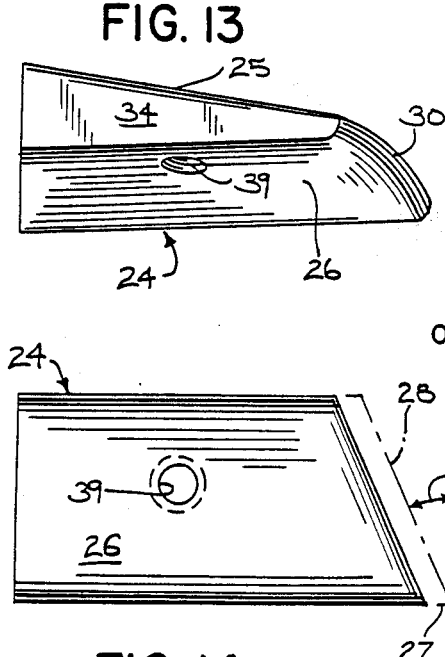
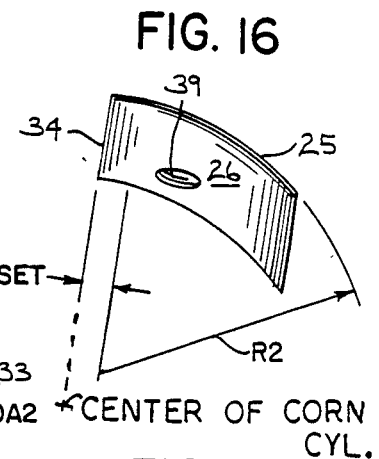
FIG. 14
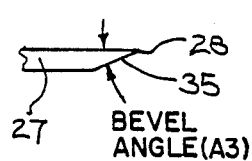
FIG. 17

BLADE APPARATUS FOR RENEWING CUTTING EDGES IN CORN PROCESSING EQUIPMENT

This is a division of application Ser. No. 733,989, filed May 13, 1985, pending.

TECHNICAL FIELD

The invention relates to methods and apparatus for cutting and stripping corn kernels from corn cobs, and in particular, to the cutting instruments used for this purpose.

BACKGROUND ART

Much of the sweet corn that is grown for human consumption is removed from the cob for canning and freezing while the corn kernels are still "green". Corn is considered green when the kernels are still moist and soft and have not matured into seed.

One type of machine that is used in the food processing industry for this purpose is shown and described in Kerr, U.S. Pat. No. 2,787,273. This machine uses six cutting instruments with curved cutting edges that are generally positioned around a circle and around an adjustable aperture. The cutting instruments project forward from the aperture, and together with the aperture form what is known in the industry as an "iris". Ears of corn are shucked and then are fed endwise through the iris--small end first.

The corn cutting instruments or "knives" are unitary or integral parts that are installed in the cutting machine. Each knife has a planar arm that reaches inward towards the center of a cylindrical cutting head where the iris is located. The arm is located in a plane transverse to the longitudinal axis of each ear fed through the aperture of the iris. At the inner or working end of the arm, the knife turns parallel to the ear, and presents a blade of some width that is formed concave relative to the ear. It is known that the blade is angled upward, from heel to toe, at a certain "cob angle" from the longitudinal axis of the ear. This allows the blade to ride up the taper of the cob from the small end to the large end as the kernels are cut off.

At its free end or toe, which meets the oncoming ear of corn, the blade is sharpened to form a curved cutting edge. The curved cutting edge is more complex than a simple arcuate portion of a circle. The bottom of the blade is made concave in an arc related to a spiral cutting path around the cob. The bottom of the blade also controls the depth of the cut so that the kernels are severed at a selected height relative to the pithy part of the cob.

It is also known that the cutting edge should attain a specified oblique angle, which is seen in a plane that is tangent to a midpoint of curvature for the cutting edge. It is also known that the knives of the prior art presented an edge forming a specified "edge angle" between the tap surface of the blade and the bottom surface of the blade which rode along the ear.

In operation of the machine, the six blades are carried by a rotating cutting head and are spun around the ear as it passes through the iris. If one of the knives cuts too deeply, a spiral gouge will be seen on the stripped cob. This is one of the observations of the cob that is indicative of corn cutting inefficiency. The geometry of the cutting edges relative to the corn kernels and the corn cob must be maintained to assure a satisfactory yield of corn kernels.

After a period of use, the cutting edges become dull to the point that the yield of properly cut kernels drops. The current maintenance procedure is to remove the knives—only a small part of which is occupied by the cutting edges—and resharpen the cutting edges. This resharpening requires special equipment provided by the machine manufacturer and considerable labor for the many instances when resharpening is necessary. The machine manufacturer also recommends that periodically the knives be returned to a manufactureroperated, central sharpening facility, where the knives can be rehoned, reground and generally returned to an acceptable cutting profile. Even with these procedures, there is a further disadvantage that the blade becomes shorter with repeated resharpening and rehoning, and the original cutting knife condition cannot be fully restored.

SUMMARY OF THE INVENTION

In the present invention the cutting edges of the corn cutter knives are renewed by providing replaceable blades having characteristics which make servicing the cutter knives more convenient and less expensive than knife resharpening, while also allowing the cutting edges of the blades to achieve the complex positioning necessary for corn cutting operations.

The integral knife of the prior art is curved on both the top and the bottom, as well as presenting a curved cutting edge that tracks along a desired cutting path around an ear of corn. In contrast to the geometry of the integral knife, the replaceable blade of the present invention has a substantially planar body before being installed. When installed, the body is inclined at an acute angle relative to a corn feed path, and the body of the blade is flexed transverse to the feed path to cause the cutting edge to conform to the complex final profile for a corn cutting knife. This transverse flexing also tends to stiffen and reinforce the blade in the direction of an oncoming ear of corn.

The invention also provides a knife blade holder having an arm that extends generally, although not exactly, in a radial direction toward the central region of a cylindrical cutting head, where the blades will rotate in a tight circle around an ear of corn being fed endwise through the cutting region. There, at its inner end, each arm is provided with a clamping mechanism which includes concave and convex clamping surfaces that hold the blade inclined at an acute angle relative to the ear of corn, while flexing the blade to cause the cutting edge to conform to the desired complex cutting profile.

The invention also provides a knife blade adapted for installation in the knife blade holder, the knife blade comprising a substantially planar body that is made of steel and is relatively thin and flexible, and a cutting edge formed at a forward end of the body and disposed at an initial oblique angle relative to the transverse direction of the body, so that when the blade is flexed the cutting edge will attain an objective oblique angle. The body of the blade is heat treated with two heat treatments, one to harden the blade, and another to temper the blade thereby making it more elastic and more resistant to fracture. In the preferred embodiment the blade is also provided with apertures that cooperate with the holder to advantageously mount, locate, and prevent rotation of the blade in the holder.

Various objects and advantages of the invention will become apparent from the following description and from the drawings, which form a part hereof and which are referred to in the description. The drawings and description relate to a preferred method and preferred devices for carrying out the invention--and these are by way of examples of the invention. Such examples do not, however, represent all of the methods and devices coming within the scope of the invention, as the definition of these has been reserved for the claims which follow the description.

BRIEF DESCRIPTION OF THE DRAWINGS

FIG. 1 is a perspective view of a portion of a corn cutting machine utilizing the method and devices of the invention;

FIG. 2 is a detail schematic diagram of a portion of FIG. 1;

FIG. 3 is a detail schematic diagram showing the operation of the machine of FIG. 1;

FIG. 4 is a sectional view taken in the plane indicated by line 4—4 in FIG. 3;

FIG. 5 is a perspective view of one of the knife assemblies seen in FIG. 1;

FIG. 6 is an exploded view showing a portion of FIG. 5;

FIG. 7 is a sectional view of a first species of the embodiment of FIGS. 5 and 6 taken in the plane indicated by line 7—7 of FIG. 5;

FIG. 8 is a sectional view of a second species of the embodiment of FIGS. 5 and 6 taken in the same plane as FIG. 7;

FIG. 9 is an exploded view showing a second embodiment of the portion of the knife assembly shown in FIG. 6;

FIG. 10 is a sectional view of the embodiment of FIG. 9 taken in the same plane as FIGS. 7 and 8;

FIG. 11 is a sectional view taken in the plane indicated by line 11—11 in FIG. 5;

FIG. 12 is a schematic view taken in the same plane as FIG. 11;

FIG. 13 is a side elevational view of a shoe that is part of the assembly of FIG. 5;

FIG. 14 is a top plan view of the shoe of FIG. 13 showing the blade of FIGS. 6, 9 and 11 installed in phantom;

FIG. 15 is a rear elevational view of the shoe of FIG. 13;

FIG. 16 is a front elevational view of the shoe of FIG. 13; and

FIG. 17 is a detail view of the blade of FIGS. 6, 9, 11 and 12.

DETAILED DESCRIPTION OF THE PREFERRED EMBODIMENTS

The invention is practiced with and incorporated in components used in a set of six corn cutting knives 10, which are illustrated in FIG. 1 in their operating position within a cylindrical cutting head 11 (in phantom) of a corn cutting machine. The cutting edges of the knives 10 are generally positioned around a circle and around an aperture 12 as seen best in FIG. 2. The knives 10 are adjustable relative to the center of the aperture 12, so that the aperture can be opened up or closed down under various operating conditions. Ears of corn, represented by the ear 13 in FIG. 1, are shucked and then fed endwise—small end first—along a corn feed path, passing through the aperture and the cutting edges, which together form what is known in the industry as an "iris". The center of the iris is located along the longitudinal axis 13a of the ear 13 as the ear moves along the corn feed path.

The corn cutting machine may be any one of several models of corn cutting machines manufactured by FMC Corporation. These include the Model 2, the Model 3AR, and the Model SC-120 corn cutter machines. For general background concerning the construction and operation of these machines, reference is made to Kerr, U.S. Pat. No. 2,787,273, and to the commercial literature and service manuals available from FMC Corporation. Although the description herein shall relate to the Model 2 and the Model 3AR, the teaching is applicable to the Model SC-120 as well.

Referring now to FIG. 1 in conjunction with FIGS. 2 and 3, the cutting head 11 is rotated in a counterclockwise direction as ear 13 is moved longitudinally along the corn feed path. This causes the cutting edges 28 to move in spiral paths around the ear 13 as seen in FIG. 3. The edges 28 are each disposed at an oblique angle relative to the longitudinal axis of the ear 13 and relative to any diametrical cross section through the ear 13. Such a cross section is illustrated as being in the X-Y plane in FIGS. 2 and 3. When the curved cutting edge 28 is viewed in a plane tangent to a midpoint of its curvature, as approximated by FIG. 3, it appears as a straight line that is positioned at an oblique angle OA2 relative to a diametrical cross section through the ear. In this example, the angle OA2 is 25°, plus or minus some allowable tolerance. With multiple cutting edges disposed at this oblique angle OA2, kernels are stripped from the cob in overlapping spiral cutting paths, referred to as SWATH 1 and SWATH 2 in FIG. 3. If the edges were perpendicular to the longitudinal axis and parallel to a diametrical cross section of the ear 13, the rotation of the edges would leave a spiral pattern of kernels uncut, because the narrower SWATH 1' and SWATH 2' swaths would not overlap.

Referring to FIG. 4, which is a sectional view taken in the plane of the angle OA2, the cutting path CP appears to be elliptical, because an ellipse is defined by the intersection of an oblique plane and a corn cob cylinder or cone. In three-dimensional space, the cutting path CP is actually a spiral of ever increasing diameter so that the curvature of the elliptical arc is more gently curved as the cutter progresses towards the larger end of the cob 13b.

Referring next to FIG. 5, each knife 10 is an assembly of a knife blade holder 14 and a blade 15. The holder 14, in turn, includes a member formed with a counterweight portion 17 at one end, a foot 19 at the other end, and a gently curving arm 18 that extends from the portion 17 to the foot 19. The foot 19 is assembled to a shoe 24 to provide a blade clamping mechanism at the inner end of the arm 18 which is to be positioned towards the center of the cylindrical cutting head 11 in the region of the iris as seen in FIG. 1.

When the arm 18 meets the counterweight portion 17 of the holder member in FIG. 5, a hole 21 is formed to pivotably mount the holder 14 within the cutting head 11. When the cutting head 11 of FIG. 1 is rotated, the holders 14 tend to pivot in a counterclockwise direction around the holes 21 due to the curvature and displacement of the arm 18 and the counterweight portion 17 relative to a radius from the arm's pivot axis 22 to the blade 15. The amount of actual pivoting is controlled by other parts (not shown) of the cutting head 11 so that the curved cutting edges 28 are pivoted from a starting minimum diameter corresponding to the small end of the ear 13 to some maximum diameter corresponding to the large end of the ear.

The starting minimum diameter is set in response to gauging apparatus positioned forward of the iris in the corn cutting machine to meet and sense the size of the small end of the ear 13. The iris diameter is set to the diameter of the small end if the cob 13b plus an additional radial increment that produces the desired depth of cut along the cutting path CP, as shown in FIG. 4. The depth of cut is the height at which the kernels 13c are severed from the cob 13b. As the ear 13 moves through the iris, the cutting edges 28 are forced to a position of increasing radius from the center of the iris, until they reach the point where they allow the largest diametrical cross section of the corn cob 13b to pass.

With the holders 14 mounted in their operating position seen in FIG. 1, the arms 18 extend generally, but not exactly, radially inward towards the iris. The arms 18 are substantially planar, i.e., they are disposed in a plane transverse to the corn feed path. Because they have a thickness they are also disposed in several other adjacent transverse planes. In this instance, a "transverse" plane is one that is normal to the longitudinal axis of the ear of corn and to the corn feed path. Each holder 14 turns from the transverse plane of the arm 18 into an integrally formed foot 19 that runs longitudinally with respect to the corn feed path and the longitudinal axis of an oncoming ear of corn.

Referring next to FIGS. 6 and 9, two species of blade clamping mechanisms for securing the blade 15 in position are shown. The two mechanisms differ in the way they prevent the blade 15 from rotating around an axis of fastening provided by fastener 42. In FIG. 6 the foot 19 forms a concave blade clamping surface 23 to contact the top side of the blade 15. A wedge-shaped shoe 24, on the other side of the blade 15 in FIG. 6, forms a convex blade clamping surface 25 to contact the bottom side of the blade 15. It will be seen in FIGS. 11 and 12 that these two surfaces 23 and 25 are elevated at the rear of the foot 19 and shoe 24 to position the blade 15 at an acute angle relative to the corn feed path and the longitudinal axis of an oncoming ear of corn. This acute "attack angle" is calculated by subtracting a "cob angle" shown in FIG. 12 from an overall edge angle that was utilized in a knife of the prior art having an integrally formed cutting blade. The "cob angle" is the angle at which the concave surface 26 of the shoe 24 that faces and engages the cob 13b is oriented relative to the corn feed path and to the longitudinal axis 13a of an oncoming ear of corn 13.

Referring again to FIGS. 6 and 9, the blade 15 has a substantially planar, elongated body with apertures 41, 43 and 46 in FIG. 6 and with apertures 41 and 46 in FIG. 9. The centers of the apertures 41 and 46 are located along a longitudinal axis 32 for the blade 15, and the center of aperture 43 is also located on this axis. It will become apparent from the following description that these apertures 41, 43 and 46 could also be located on either side of this longitudinal axis 32. They are described here as being on the axis to assist the location of this axis in the drawings.

The blade 15 may be made of (1) a high to medium carbon steel, (2) a high to medium carbon low alloy steel, (3) tool steel, or (4) stainless steel. The preferred material is a high carbon steel designated AISI C-1095. The blade 15 is made relatively thin—so that it can be flexed—and the term "thin" as related to the blade shall mean a thickness dimension in a range from 0.005 inch to 0.025 inch inclusive. The preferred thickness dimension for the blade 15 is from 0.011 inch to 0.013 inch inclusive. Preferably the blades are mass produced in strips, from which the blades are separated. The blades are treated with two heat treatments. In one of these, the blade strips are heated to a relatively higher temperature and then quenched to harden the blades. In the other, the blade strips are heated to an elevated, yet relatively lower temperature, and then quenched to impart tempering and elasticity.

At the forward end of its body 27, the blade 15 is angled at an initial oblique angle OA1 of approximately 23.5° (allowing for some tolerance), which is shown in FIG. 6 relative to a transverse axis 33 that is orthogonal to the longitudinal blade axis 32. The initial oblique angle OA1 is selected so that when the blade 15 is flexed, it will attain the objective oblique angle OA2 shown in FIGS. 3 and 14. As seen in FIG. 17, the cutting edge 28 is preferably flat along the top side of the blade 15 with a bevel 35 provided along the bottom side. The length of the beveled region should be from 1/16 inch to 1/32 inch inclusive for best results. For the preferred thickness of the blade 15, this results in a preferred bevel angle A3 of approximately 16° between the top and bottom sides adjacent the edge 28.

Referring now to FIGS. 6, 9 and 11, the blade 15 is mounted in the holder 14 by inserting it between the blade clamping surfaces 23, 25 with the apertures 41, 43 and 46 in the blade 15 positioned to properly locate the blade 15 relative to the foot 19 and the shoe 24. A fastener 42—in this instance, a screw—is inserted through a screw guide hole 38 in the foot 19, through the large aperture 41 in the blade 15, and into a tapped hole 39 in the shoe 24, where it threadingly engages the shoe 24. The assembly is secured by turning the screw 42 to draw the convex surface 25 of the shoe 24 upward against the blade 15 and then the concave surface 23 of the foot 19, as seen in FIG. 7, 8 and 10, which causes the blade 15 to flex in a direction transverse to its longitudinal axis 32 and to conform to the curvature of the complementary blade clamping surfaces 23, 25.

FIG. 7 illustrates a species of the blade clamping mechanism applicable to the FMC Model 3AR corn cutter where a radius from a pivot axis 22 for the arm is tangent to the near side of the blade 15. FIGS. 8 and 10 illustrate the blade clamping mechanisms of FIGS. 6 and 9 as applied to the FMC Model 2 corn cutter where the radial reference for the arm is tangent to the midpoint of curvature of the blade 15.

It is good machine design practice to make the mounting aperture 41 substantially larger in diameter than the screw 42. When this practice is followed the blade 15 may tend to rotate around the axis of the screw 42, so in FIG. 6 two additional pins 44 are positioned to project from the concave blade clamping surface 23 through more closely fitting apertures 43 and 46 in the blade 15 and into corresponding holes 48 in the shoe 24. This provides two additional points at which the blade 15 is secured, and this prevents rotation of the blade 15 around the fastener 42.

Besides preventing rotation, the pins 44 and apertures 43, 46 are also important in locating the cutting edge 28 of the blade 15 to control its projection beyond the leading edges 29, 30 of the foot 19 and shoe 24, respectively. The leading edges 29, 30 are designed to run parallel to the cutting edge 28 of the blade 15 as will be described in more detail below. The pins 44 are located so as to cause the cutting edge 28 to project approximately ⅛ inch forward of the leading edges 29, 30 along its entire length. This provides the best support of blade 15, while limiting entry of cuttings in between the blade 15 and the clamping surfaces 23 and 25.

Referring to FIG. 9, a second species of the non-rotation mechanism is provided by forming side rails 31 along opposite sides of the concave blade clamping surface 23 to further form a blade receiving channel. When the blade 15 is positioned in this channel and fastened in place by the screw 42, the side rails 31 will prevent rotation of the blade 15 on the blade clamping surfaces 23 and 25. A single pin 44 projects from the concave blade clamping surface 23 through aperture 46 and into the shoe 24 to locate the cutting edge 28 relative to the leading edges 29, 30 as described for the first species.

The method of the invention is advantageous in allowing the use of a substantially planar, replaceable blade 15, and yet producing a corn cutter knife 10 with a cutting edge 28 that attains the complex profile of the prior art integral cutter knives. To carry out the method of the invention, the blade 15 is made as described above so that it is flexible in a direction transverse to a longitudinal blade axis 32 and has a cutting edge 26 angled at an oblique angle relative to the transverse direction of the blade body 28. The blade 15 is positioned in the holder 14 with its longitudinal blade axis 32 forming the acute "attack angle" relative to the longitudinal axis 13a of an ear of corn 13 moving longitudinally through the machine. The blade body 28 is then flexed by the assembly procedure described earlier to cause the cutting edge 26 to conform to the desired curved profile.

Referring to FIGS. 11-16, the shape of the concave surface 23 on the foot 19 and the shape of the surfaces 25, 26 on the shoe, as well as the line of the leading edges 29, 30, is determined by various aspects of corn cutter and corn geometry. It is well known that ears of corn, as well as corn cobs, are tapered. It has been found that corn exhibits some average or typical taper, which is identified in FIG. 12 as the "cob angle". If the envelope of the cob 13b were extended it would define a cone. The bottom surface of the corn cutter knives of the prior art inclined along a longitudinal axis at the cob angle, and this cob angle can be measured for any particular knife, or it can be determined from a statistical sample of corn ears. The bottom surface 26 on the shoe 24 of the present holder 14 is, therefore, inclined at this angle so as to ride up the cob as well as around it in a widening spiral. Because the cob angle is typically very acute, however, the curvature of the surface 26 is based on a cylinder tilted at the cob angle rather than a cone. The radius of this theoretical cylinder is selected so that the shoe 24 will a along an acceptable spiral cutting path for ears of the size typically processed by the machine. This radius can be measured on the integral corn cutter knives of the prior art.

As explained earlier, the integral knives of the prior art formed a cutting edge angle between this bottom surface 26 and the top surface of what is now the foot 19. In the present invention, the clamping surfaces 23, 25 are formed to hold the blade body 27 with the longitudinal blade axis positioned at this former cutting edge angle. The angle of the blade axis is also related to a line parallel to the corn axis and to the corn feed path, and this angle is identified in FIG. 12 as the "attack angle".

Once the blade body 27 has been elevated to a selected attack angle, then its amount of flexing in the transverse direction is calculated by finding an intersection between a portion of a "blade cylinder" defining the surface 23 and the cob cylinder. Referring to FIG. 12, the blade cylinder and the cob cylinder have been selected to intersect at an angle equivalent to the edge angle of the integral knife of the prior art. For one such integral knife that edge angle was approximately 10°. The intersection of cylinders is determined as a line intersection which defines the cutting edge, which when viewed from the appropriate plane, achieves the desired, or objective oblique angle—in this example 25°—of the cutting edge relative to a diametrical cross section of an ear of corn.

The resolution of this problem defines a cylindrical surface 23 with a somewhat small radius that the radius R1 of the corn cylinder (which defines surface 26). This smaller radius of surface 23 is slightly greater, by the thickness of the blade, than the radius R2 of surface 25 which is illustrated in FIG. 16. The centers for the radii defining the surfaces 23 and 25 coincide, and are offset in a transverse direction from the center of the corn cylinder and from leading side 34 of the foot 19 and the shoe 24 as shown in FIG. 16. Since the convex top surface 25 is defined by this smaller radius R2, it is more curved than the bottom surface 26. Remembering that the initial oblique angle OA1 of the blade was less than 25° when the blade was planar, it can be seen that flexing the blade body 27 (seen in phantom in FIG. 14) increases slightly the oblique angle of the cutting edge 28 to OA2 as the width of the blade is narrowed, and this change of angle must be considered in making the blade 15.

Besides attaining the desired cutting edge profile, the flexing of the planar blade 15 in the transverse direction provides resistance to bending in the longitudinal direction. This, along with the support of the blade to within approximately ⅛ inch of its cutting edge, and heat treating the blade to temper it and make it more elastic and less brittle, are factors which contribute to extend the time between replacements of the blade.

It should be understood that many of the details related herein have been by way of example, and other ways to practice the method or to make the implements of the invention will be apparent to those skilled in the art, as well as equivalent methods and implements, and that these also are considered to be within the scope of the invention to the extent they come within the scope of the following claims.

I claim:

1. A knife blade adapted for installation in a knife blade holder in a rotatable cutting head in a corn processing machine to encounter an oncoming longitudinally oriented ear of corn that is fed through the cutting head, the knife blade comprising:

a substantially planar elongated body which is formed along a blade axis to be disposed longitudinally with respect to an ear of corn moving longitudinally through the machine and which is formed of steel at a thickness from 0.005 to 0.025 inches inclusive and is heat treated with a first treatment to harden the body and is heat treated with another heat treatment so as to be flexible in a direction transverse to the longitudinal axis; and a cutting edge formed at a forward end of the body and disposed at an initial oblique angle relative to the transverse direction of the body so that when the blade is flexed in a direction transverse to the blade axis the cutting edge can attain an objective oblique angle and better withstand forces encountered in the direction of the blade axis.

2. The knife blade of claim 1, wherein the body also forms non-rotation means cooperable with the knife blade holder to prevent rotation of the longitudinal axis of the blade relative to the knife blade holder.

3. The knife blade of claim 2, wherein the body also forms securing means cooperable with a fastener and with the knife blade holder to secure the blade in the knife blade holder, and wherein the securing means is formed separately from the non-rotation means.

4. The knife blade of claim 1, wherein the cutting edge is formed with a flat top side and a beveled portion on a bottom side, and wherein the length of the beveled portion is from 1/16 inch to 1/32 inch inclusive.

5. The knife bade of claim 1, wherein the body also forms location means cooperable with the knife blade holder to locate the blade in the knife blade holder with the cutting edge projecting approximately ⅛ inch from the knife blade holder along a full length of the cutting edge.

6. The knife blade of claim 1, wherein the body is formed at a thickness from 0.011 to 0.013 inches inclusive.

7. The knife blade of claim 1, wherein the body and cutting edge are formed of a high carbon steel.

8. The knife blade of claim 1, wherein the body and cutting edge are formed of stainless steel.

9. A corn cutter knife blade adapted for installation in a knife blade holder in a rotatable cutting head in a corn processing machine to encounter an oncoming longitudinally oriented ear of corn that is fed through the cutting head, the knife blade comprising:
   a substantially planar elongated body formed along a longitudinal axis, the body formed of steel at a thickness from 0.005 to 0.025 inches inclusive to be flexible and resilient in a direction transverse to the longitudinal axis; and
   a cutting edge formed at a forward end of the body and disposed at an initial oblique angle relative to the transverse direction of the body so that when the blade is flexed in a direction transverse to the longitudinal axis the cutting edge can attain an objective oblique angle and better withstand forces encounted in the direction of the longitudinal axis of the blade.

10. The knife blade of claim 9, wherein the body also forms at least one non-rotation aperture defining a portion of the blade that is cooperable with the knife blade holder to prevent rotation of the longitudinal axis of the blade relative to the knife blade holder.

11. The knife blade of claim 10, wherein the body also forms a securing aperture defining a portion of the blade which is cooperable with a fastener and with the knife blade holder to secure the blade in the knife blade holder, and wherein the securing aperture is formed separately from the non-rotation aperture.

12. The knife blade of claim 11, wherein the non-rotation aperture and the securing aperture are located to hold the blade in the knife blade holder with the cutting edge projecting approximately ⅛ inch from the knife blade holder along a full length of the cutting edge.

13. The knife blade of claim 9, wherein the cutting edge is formed with a flat top side and a beveled portion on a bottom side, and wherein the length of the beveled portion is from 1/16 inch to 1/32 inch inclusive.

14. The knife blade of claim 9, wherein
    the blade body has a transverse axis that is orthogonal to the longitudinal axis; and
    wherein the cutting edge is formed with the initial oblique angle of about 23.5° relative to the transverse axis of the blade body.

15. The knife blade of claim 9, wherein the body is formed at a thickness from 0.011 to 0.013 inches inclusive.

16. The knife blade of claim 9, wherein the body and cutting edge are formed of a high carbon steel.

17. The knife blade of claim 9, wherein the body and cutting edge are formed of stainless steel.

* * * * *

UNITED STATES PATENT AND TRADEMARK OFFICE
CERTIFICATE OF CORRECTION

PATENT NO. : 4,823,816
DATED : April 25, 1989
INVENTOR(S) : Gerald F. Maruska

It is certified that error appears in the above—identified patent and that said Letters Patent is hereby corrected as shown below:

In The Title "BLADE APPARATUS" should be --BLADE--.

Column 1, line 58 "tap" should be --top--.

Column 2, line 10 "manufactureroperated" should be --manufacturer-operated--.

Column 3, line 43 "top" should be --bottom--.

Column 4, line 57 "When" should be --Where--.

Column 8, line 15 "small radius that" should be --smaller radius than--.

Column 9, line 16 "bade" should be --blade--.

Signed and Sealed this

Fifth Day of June, 1990

*Attest:*

HARRY F. MANBECK, JR.

*Attesting Officer*     *Commissioner of Patents and Trademarks*